(12) United States Patent
Kewitsch

(10) Patent No.: US 9,110,249 B2
(45) Date of Patent: Aug. 18, 2015

(54) IN-LINE FIBER OPTIC MONITORS RESPONSIVE TO OPTICAL INTENSITY

(75) Inventor: Anthony Kewitsch, Santa Monica, CA (US)

(73) Assignee: Telescent Inc., Marina del Ray, CA (US)

( * ) Notice: Subject to any disclaimer, the term of this patent is extended or adjusted under 35 U.S.C. 154(b) by 258 days.

(21) Appl. No.: 12/626,679

(22) Filed: Nov. 26, 2009

(65) Prior Publication Data

US 2010/0074616 A1 Mar. 25, 2010

Related U.S. Application Data

(63) Continuation-in-part of application No. 11/865,731, filed on Oct. 2, 2007, now Pat. No. 7,665,901.

(60) Provisional application No. 61/119,504, filed on Dec. 3, 2008.

(51) Int. Cl.
*G02B 6/38* (2006.01)
*G02B 6/42* (2006.01)

(52) U.S. Cl.
CPC ............ *G02B 6/3825* (2013.01); *G02B 6/3846* (2013.01); *G02B 6/3897* (2013.01); *G02B 6/4202* (2013.01); *G02B 6/3885* (2013.01); *G02B 6/3895* (2013.01); *G02B 2006/4297* (2013.01)

(58) Field of Classification Search
CPC .. G02B 6/3825; G02B 6/3846; G02B 6/4202; G02B 6/3897; G02B 2006/4297; G02B 6/3895; G02B 6/3885
USPC .......................... 385/40, 48, 49, 70, 71, 73, 75
See application file for complete search history.

(56) References Cited

U.S. PATENT DOCUMENTS

2006/0197943 A1* 9/2006 Kewitsch ..................... 356/73.1

* cited by examiner

*Primary Examiner* — Ryan Lepisto
(74) *Attorney, Agent, or Firm* — Raymond Bogucki

(57) ABSTRACT

Apparatus and methods to monitor optical intensity within optical fibers in a substantially non-invasive fashion are disclosed. Optical monitors are comprised of thin, conductive coatings applied to transparent substrates and patterned to form pairs of resistive elements, one of which intersects an optical beam propagating through optical fiber cables. Systems of distributed optical monitors interconnecting optical fiber links enable automated monitoring of the optical status across a communications networks.

21 Claims, 11 Drawing Sheets

IN-LINE FIBER OPTIC MONITORS RESPONSIVE TO OPTICAL INTENSITY

REFERENCE TO RELATED APPLICATIONS

This application is based on Provisional Patent Application No. 61/119,504, filed on Dec. 3, 2008 and entitled "Transparent Nanowire Optical Detectors", and is a Continuation-in-Part of U.S. patent application Ser. No. 11/865,731, filed on Oct. 2, 2007 and entitled "Protective Fiber Optic Union Adapters".

FIELD OF THE INVENTION

This invention relates to optical systems comprised of fiber optic cables transmitting illumination and/or signals, and more particularly, to devices enabling distributed measurements of the optical intensity and power transmitted within fiber optic cables.

BACKGROUND OF THE INVENTION

A wide range of optical detectors have been developed to detect visible and infrared illumination, characterized by the use of a highly absorbing detector thin film or substrate [Dereniak and Boreman, "Infrared Detectors and Systems", Wiley (1996)]. Typically, the active layer (e.g., p-n junction) of these detectors absorbs a majority of the incident photons, thereby maximizing the detection efficiency and signal-to-noise ratio. For instance, thermal detectors or bolometers absorb light within a low thermal mass structure, causing the film to heat up. The resulting temperature change is determined by measuring the resistance across a conductor spanning the structure. The conductor may be metallic, or a semiconductor/superconductor with a high temperature coefficient of resistance.

Unique structures and techniques to improve the performance of optical detectors have been reported in the literature on superconductor bolometers [A. T. Lee, P. L. Richards, S.-W. Nam, B. Cabrera, and K. D. Irwin, "A superconducting bolometer with strong electrothermal feedback," Appl. Phys. Lett. 69, 1801 (1996)], superconductor nanowire detectors [A. Kerman, E. A. Dauler, J. K. W. Yang, K. M. Rosfjord, V. Anant, K. K. Berggren, G. N. Gol'tsman, B. Voronov, "Constriction-limited detection efficiency of superconducting nanowire single-photon detectors", Appl. Phys. Lett. 91, pp. 101110-1 to 101110-3 (2007)] and semiconductor nanowire detectors [P. Servati, A. Colli, S. Hofmann, Y. Q. Fu, P. Beecher, Z. A. K. Durrani, A. C. Ferrari, A. J. Flewitt, J. Robertson, W. I. Milne, "Scalable Silicon Nanowire Photodetectors", Physica E 38, pp. 64-66 (2007)].

In contrast to traditional applications of optical detection for imaging or optical signal reception, there is a specialized need in fiber optic networks to monitor high intensity optical power propagating through optical fibers in a "transparent" fashion, by development of a measurement device which leaves the optical signal substantially unattenuated. This application requires low transmission loss (<0.5 dB) moderate sensitivity (1 µW) and relatively low bandwidth (kHz). Transparency enables distributed optical monitoring across large scale fiber optic communication networks, such that multiple passes through cascaded monitors does not compromise digital and or analog optical signal quality.

Prior art optical monitors typically incorporate a semiconductor photodiode and micro-optical elements in precise alignment to divert a small port of guided light onto the photodiode. Such detectors are responsive to total optical power and are relatively independent of optical intensity. For example, US Patent Application 2009/0016716 by Isida describes a fiber array, tap coupler, photodetector, integrated with planar lightwave circuit. US 2009/0213363 by Starodubov et al. and U.S. Pat. No. 6,259,842 to Giltner utilize one or more tap beam splitters and photodiodes. Alternatively, Shapiro et al. in US 2004/0022494 describes a monitor device in which a small amount of power is tapped off onto a photodiode by selectively grinding and polishing off the optical fiber's cladding.

U.S. Pat. No. 7,042,015 to Sun et al. discloses a semitransparent detector based on thin amorphous silicon semiconductor layer with low absorption, with a transparent conductor on top and bottom as electrical contact layers. Wang et al. describes an "Optical Power Monitor Based On Thermo-Chromic Material" in US 2009/0153837, in which photo-induced heating of an absorbing film changes color, the color change being related to light intensity.

A transmissive optical detector based on a photo-thermal-electric mechanism has been reported in U.S. Pat. No. 7,289,197, entitled "Transmissive Optical Detector", to A. S. Kewitsch. These detectors are slightly absorptive, passing the majority of the optical signal through without degradation, and utilize transparent conductive thin films such as indium tin oxide as the sensing element.

Compact, low loss fiber optic components incorporating transmissive detector elements within industry standard fiber optic interfaces, using differential configurations for compensation for ambient temperature changes, will enable the automation of optical network management and testing for improved network visibility and safety. In particular, safety and automation are increasingly important considerations in designing systems based on optical fibers. Advances in the design and manufacturing of fiber-coupled laser sources are leading to a proliferation of mainstream high power fiber applications and raising new laser safety issues. Numerous laser applications in communication networks, manufacturing and medicine have created a demand for more power, primarily to reduce the cost to transmit data over increasing distances or to speed-up or enable new processes and procedures.

It is common for the optical power carried by optical fibers to exceed eye safe limits. In particular, Raman amplified fiber optic communication systems are widespread and transmit high optical powers (>1 W) within single mode fiber. In addition, 1.0 µm fiber lasers producing 1 to 10,000 W are used in a wide range of manufacturing, medical and defense applications to perform processes such as cutting, marking, printing and welding. In these systems the fiber optic beam delivery systems typically propagate optical power away from the laser source and deliver light to a distant target through detachable connectors and cable segments. As a result, the users of such a system are often unaware that the fiber is transmitting significant power, leading them to disconnect or handle the active fiber in an unsafe manner.

For instance, if the fiber is bent excessively, harmful levels of optical power can escape from the side of the fiber due to bend-induced outcoupling, analogous to a leaky pipe. Since infrared wavelengths are invisible to the human eye, the natural protective reflexes of the eye (i.e., squinting) do not occur. To remedy this safety hazard in a manner than is compatible with existing fiber optic systems, a small form-factor indicator of unsafe optical power levels is needed. Current photodiode-based tap couplers are not well suited for this application because they are bulky, high loss and costly. Therefore, there is a further need for new devices and systems to enhance the intrinsic safety of fiber optic systems.

SUMMARY OF THE INVENTION

In accordance with the invention, the optical intensity transmitted in a confined mode is measured with minimal interference or attenuation. Ideally, optical intensity is measured at the core of the fiber to eliminate the loss of power inherent when coupling light out of the fiber and onto a photodiode. This need arises when trying to determine signal levels in optical fibers. By disposing microwires or nanowires transversely across the light-guiding section of the fiber, this minute wire traverses the optical path of the optical fiber. The detector wire is receptive to and exhibits a response proportional to the transmitted optical intensity, rather than optical power. The wire's geometry and material characteristics are selected to not interfere substantially with transmission, yet to absorb adequate energy for signal detection. These microwires and nanowires, which can be called "traces", are formed as geometric patterns lithographically produced in a thin conductive layer such as indium tin oxide (ITO). Traces are of a configuration and size to absorb approximately 1% to 10% of the intersected radiation, depending on thickness, in the visible and infrared wavelength ranges. The trace element is thermally excited when the optical intensity passing through the trace is about 1 mW/mm$^2$ or more, regardless of the total optical power of the beam. A proportional resistance change is generated by thermal heating in the element and is measured electronically, with adequate signal-to-noise ratio, by using circuit elements exterior to the transmitting core of the radiation propagating element. The optical energy propagated in the fiber waveguide is transmitted with nearly zero insertion loss, so that adequate signal strength is preserved.

In accordance with the invention, the patterned traces on the conductive layer may advantageously include anti-reflection coatings and/or thin film interference coatings to provide for optical filtering. Another feature of the invention resides in the fact that the detector traces can be reduced to nanometer scale dimensions, thus affording high-speed operation to demodulate wide bandwidth optical signals.

Further in accordance with the invention, multiple detectors can be disposed in an array at low cost throughout a fiber optic communication system. When detectors are connected between optical fibers of well defined mode-field diameters, they can measure not only optical intensity, but they also provide an indirect, yet accurate measure of optical power through a multiplicity of fiber optic junctions. Costs can be minimized by disposing the detectors on any of a wide variety of substrates of different materials and geometries. Detectors in accordance with the invention can also be used in monitoring and safety applications where unsafe optical power levels might exist.

In accordance with the invention, a more specific detector-on-fiber configuration employs a lithographic pattern transversely aligned on an optical fiber end face to define the radiation responsive element. Advantageously it may comprise a patterned, transparent ITO coating configured as a resistive stripe on a thin transparent substrate and traversing the central core of the optical fiber. At a chosen thickness (e.g. 5 to 50 nm) and width (e.g. about 10 μm), such an ITO element introduces less than 0.25 dB absorption and a detectable change in resistance in response to illumination causing localized heating in the vicinity of the core. The resistance change is measured by an exterior electronic circuit coupled to the terminals of the element and disposed in non-interfering relation to the transmitted optical energy. In some implementations the electronic circuit may activate an LED when the internal optical intensity/power exceeds a predetermined threshold. In a power monitor exemplification, the exterior LED visibly signals the existence of potentially harmful invisible infrared optical radiation.

The same detectors, moreover, can also be employed in network control systems to indicate the propagation of live data in the interior of the optical fiber and prevent the interruption of communications resulting from a mistaken disconnection. Further in accordance with the invention, detectors can alternatively be incorporated in ferrule assemblies, optical fiber end faces, and internally in multi-fiber optical connectors.

DETAILED DESCRIPTION OF THE INVENTION

Figure 10:
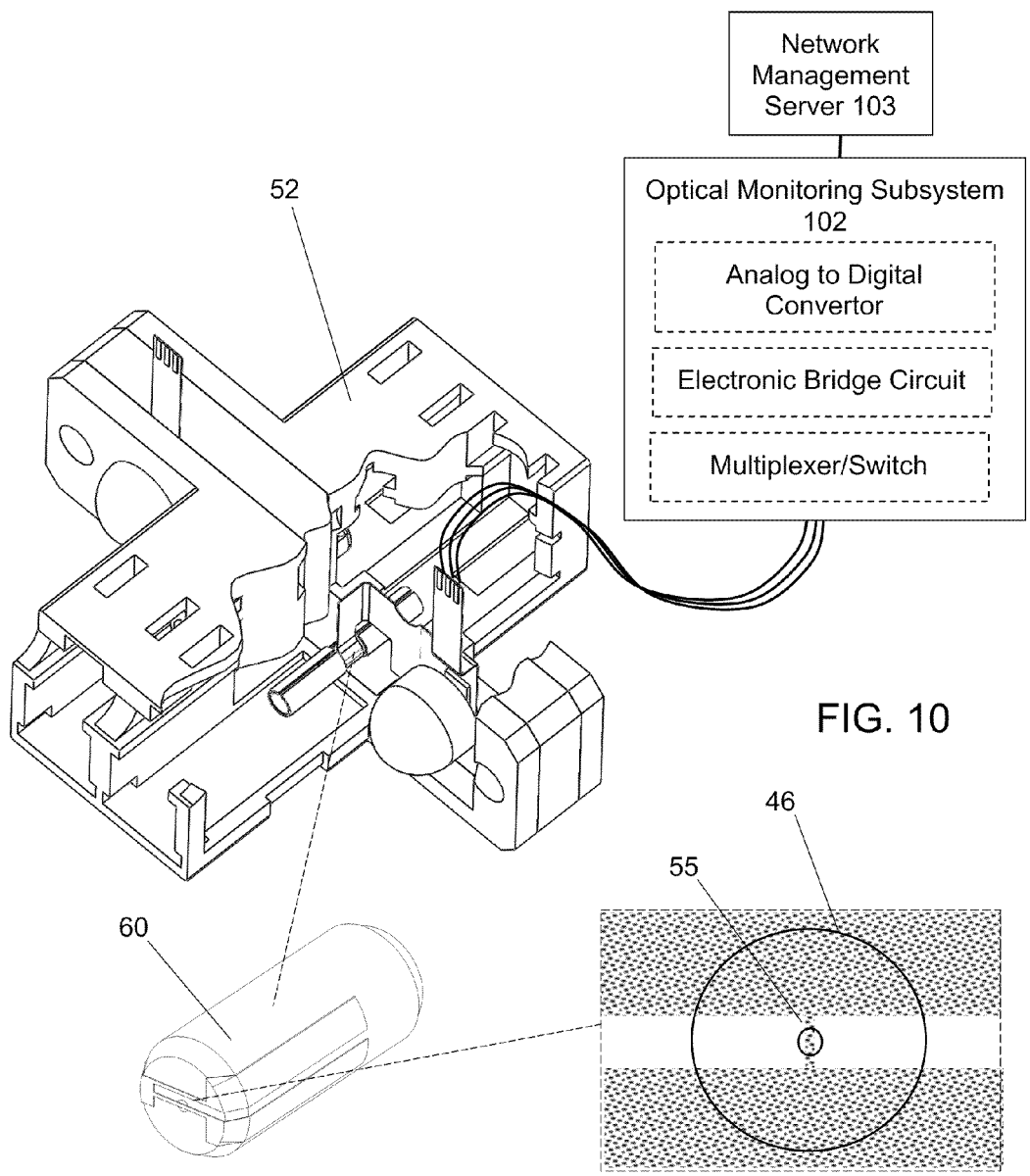
FIG. 10 illustrates the relationships between the network management system, detector electronics, in-line fiber optic interface, and transparent detector coating.

This invention discloses a miniature fiber optic monitor device 52 responsive to optical intensity, which, in the case of an duplex monitor (FIG. 10), includes two input 38 and output 39 fiber optic connector receptacles to receive a pair of duplex connectorized fiber optic cables (not shown here), and measure the optical intensity transmitted therebetween and propagating through an in-line polished fiber stub 60. In the examples that follow, it should be appreciated that this detection mechanism is fundamentally related to optical intensity, but for a subset of applications, the detector can be calibrated to also provide an accurate measure of optical power as well. For instance, waveguides typically have well-defined and consistent optical mode field diameters, resulting in a well-defined relationship between optical intensity and optical power. In general, this relationship is wavelength-dependent, because the mode field diameter of a given waveguide increases slightly with wavelength.

This monitor device is comprised of multi-layered and multi-patterned thin film coatings on the fiber end face 65, including at least one layer of optically transparent and electrically conductive coating such as indium tin oxide (ITO) or other transparent conductors (e.g., zinc oxide). ITO is deposited to a thickness of 5 to 50 nm to form a detector element 55 in the form of a 10 nm to 10 μm wide trace 56 crossing the core 56 of optical fiber 46. In general, such detector elements 55 are disposed in matched pairs, the other of the pair not exposed to intense optical radiation. Depending on the coating thickness and oxidation level, as dictated during the deposition process, ITO exhibits a sheet resistivity of 10 to 1,000 ohms/sq and an optical absorption of 1 to 10% at visible and infrared wavelengths. For communication applications, the typical wavelengths are in the range of 1200 to 1700 nm.

By lithographically patterning the ITO coating to define a microscopic detector, comprised of a matched pair of resistive wires 55, stripes, or traces 0.01 to 25 μm in width, the optical intensity within an optical fiber 46, partially absorbed upon one of the intersecting trace 55, generates localized heating and a corresponding, measurable change in resistance relative to the trace not exposed to the optical intensity.

In a further example, electrical interconnection to the resistive trace(s) 55 through the lower resistance lead-in trace(s) 33 and onto the flexible electronic interface circuit 68 occurs through an electronic multiplexer 80 to switch or time multiplex a particular monitor 52 to an electronic bridge circuit 81, thereby converting the change in resistance into a proportional voltage signal with a linear dependence on optical intensity. This may, for example, further activate an LED 67 integral to the monitor 52 should the optical intensity/power exceed a predefined threshold value.

Moreover, the analog voltage representing the optical intensity is output through a flexible electronic circuit 68 and converted to a digital signal by the analog to digital converter 82. In general, the optical intensity is determined based on a calibrated relationship between resistance and transmitted optical power, much like a thermistor's resistance is calibrated against temperature. An accurate determination of optical power requires further knowledge or estimate of the optical wavelength and the optical beam profile.

The alternating current (AC) bridge circuit 81 performs this translation from resistance change to optical intensity/power within the optical power monitoring subsystem 102. Subsystem 102 produces a highly linear measure of optical intensity with high dynamic range (1-10 ppm or 50-60 dB dynamic range). In principle, this detector is responsive to a wide range of laser wavelengths, including 670, 850, 1040, 1310, 1490 and 1550 nm, the response typically exhibiting a wavelength dependence that can be accounted for at the optical monitoring subsystem 102 or at the network management server 103.

Detector-On-Plastic Film

Figure 1:
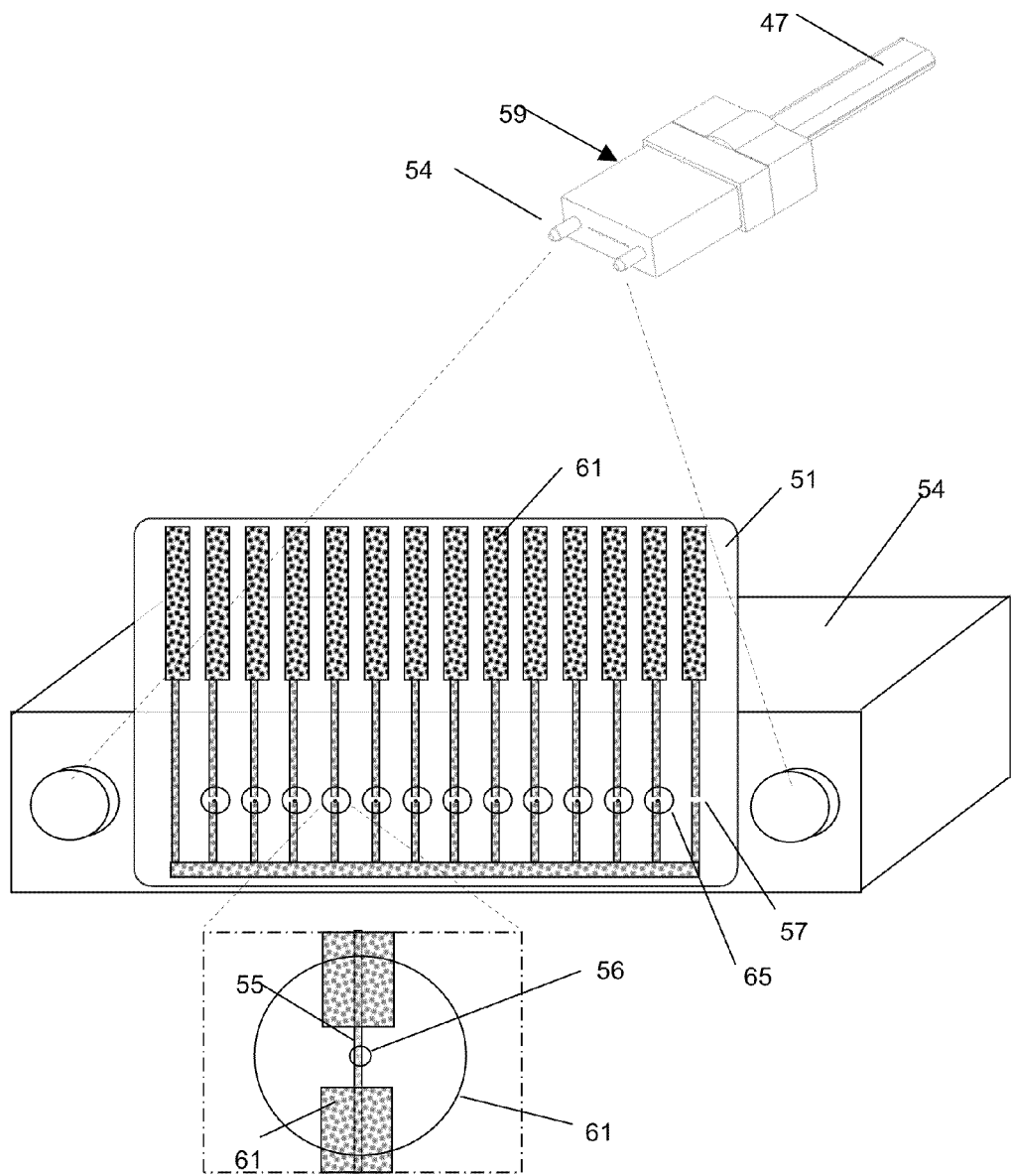
FIG. 1 is a drawing of a multi-fiber connector with a lithographically patterned detector film insert.

In a particular example, a transmissive photodetector array is deposited and patterned on a transparent, flexible plastic film 51 that is aligned to the polished end-face of a 12-fiber MTP (mechanical transfer pull-off) connector with twelve fiber molded ferrule 54 (FIG. 1). The detector microwires or nanowires 55 are each aligned to intersect the linear array of optical fiber cores 56, except for selected wires 55 serving as detector references to extract ambient temperature changes and drift. The thin film coating is comprised of a lithographically patterned layer of indium tin oxide (ITO). The ITO coating is patterned to define an array of microscopic detector elements 55 each comprised of resistive wires 0.01-25 μm in width and bridging a pair of wide ITO lead-in traces 33 transitioning to highly conductive metal (e.g., gold) electrodes 61 outside of the optically transmissive region and interfaced to the monitoring subassembly. The portion of optical power partially absorbed by each wire element 55 generates localized heating and a corresponding, measurable change in resistance, typically greater than 10 ppm and dependent on intensity.

The sensitivity of this detector increases, without increasing overall optical loss, by both increasing the optical absorption of the ITO or transparent conductive coating and by proportionally reducing the area of the resistive detection element 55 relative to the optical beam passing through. The reduction in trace area also reduces the response time of the detector, which is about 10 μs for a 1×10 μm detector element and decreases in proportion to area of the illuminated portion of the detector element. For instance, the coating is estimated to undergo a 15 to 20° C. temperature rise when 10% of a 1 mW, 10 μm diameter beam is absorbed. This corresponds approximately to a typical intensity level in a typical fiber optic communication system at 1550 nm.

ITO, zinc oxide, amorphous silicon and other selectively transparent conductive coatings can be deposited directly on the plastic film 51 by use of a cold sputtering process (<100° C.) to provide a dense and durable coating with excellent adhesion. For instance, for a typical ITO thickness of 5 to 50 nm, the corresponding sheet resistivity ranges from about 1000 ohm/sq to 100 ohm/sq, and the optical absorption at 1550 nm wavelengths ranges from about 0.5 to 10%. The exact values reflect the oxygen content, density and stoichiometry of the deposited film.

Since ITO exhibits slight absorption throughout the visible and infrared wavelength ranges, this detector is responsive to a broad spectrum spanning the visible and infrared. For micron scale resistor elements, patterning is achieved by contact lithography, deposition through a shadow mask, or direct laser writing through ablation (based on a frequency tripled Nd:YAG laser emitting at 353 nm or excimer laser at 193, 248 or 351 nm, for example). For nanometer scale patterning, deep-uv, e-beam or ion-beam lithography may be utilized.

In the particular example illustrated in FIG. 1, the fiber optic connectors depicted are industry-standard MT/MTP fiber optic connectors with twelve fibers, by US Conec Inc, for instance. The row of fiber end faces 65 is visible at the polished end face of the composite ferrule 54. By aligning the detector film 51 to these polished end faces, which are precisely spaced on 0.250 to 0.500 mm centers, the insertion loss can be minimized. In practice, the dimensions of the detector film can be made relatively small for twelve fibers, about 5×20 mm, so a large number of detector array die can be patterned from a single plastic sheet, thereby minimizing material and processing costs.

Outside of the optical fiber core region 56, the relatively high resistance ITO traces 55 merge into wider lead-in traces 33 and then low resistance gold electrodes 61 that interface to the external or integrated detection circuit. The detection film may be bonded to the connector end face with transparent UV epoxy, for example. When this connector end is inserted into a standard MTP mating adapter, the film is sandwiched between two opposing connectors. This adapter includes receptacles receiving the male MTP (with two pins) at one end and the female MTP at the other end. When both MTP connectors are inserted and engaged, the detector lies is in intimate physical contact with the two polished fiber end faces. By utilizing a sufficiently thin film 51, the net insertion loss is low (<0.25 to 0.5 dB).

Figure 2:
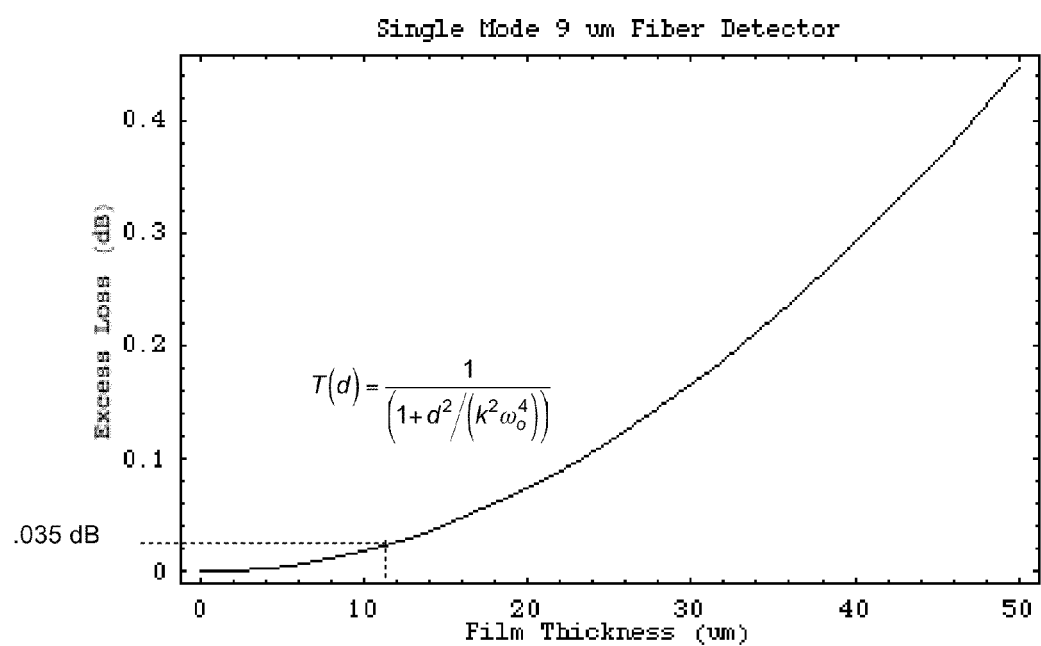
FIG. 2 plots the excess loss of the detector device, arising from the thickness of intermediate detector film placed in contact and between two aligned single mode optical fibers.

The non-zero thickness of the film 51 introduces excess insertion loss, because the opposing optical fiber end faces which sandwich and contact the detector film are not in contact. For in-line fiber optic monitoring applications in which the film is inserted in contact with the polished, parallel endfaces of opposing fibers, the thickness of the flexible substrate ranges from 12.5 to 125 μm thick. The thickness is dictated by the acceptable level of insertion loss and mode field diameter of the fiber. Smaller mode field diameter beams exhibit a larger beam divergence angle upon entering the uniform film, within which waveguiding is interrupted until the optical mode re-enters the optical fiber core at the output. In practice, this insertion loss degradation is insignificant if the substrate thickness is less than about 25 µm, preferably less than 12.5 µm, as shown in the calculated excess loss estimate of FIG. 2. This excess loss for a 12.5 mm thick film is only 0.035 dB.

The choice of flexible substrate is dictated by a combination of optical absorption and heat resistance characteristics. Polyester (PET) or high temperature sulfone (HTS) films exhibit low absorption and low scattering at visible and infrared wavelengths. The heat deflection temperature of PET film ranges from 80 to 115° C. This limits the amount of optical power that can be transmitted through the film before the onset of thermal damage. A high temperature alternative is a high temperature sulfone (HTS) film, with a heat deflection temperature in excess of 207° C. HTS also exhibits very low (<1%) intrinsic infrared absorption at 865, 1310 and 1550 nm for 25 µm thick film.

The inset to FIG. 1 details the patterning geometry in the vicinity of a waveguide core 56. For multimode fiber, this core diameter 56 is typically 50.0 to 62.5 µm and for single mode fiber the core diameter is 9.0 µm. In general, single mode systems exhibit much higher optical intensities relative to multimode systems and require different detector designs for optimal performance. In either case, the confined waveguide mode is partially absorbed at its crossing location with the ITO trace 55, thereby producing localized heating of the resistor element and inducing a resistance change ΔR that is measured by the external monitoring subsystem 102. Silica optical fibers are an ideal material system for this detector, because silica's low thermal conductivity limits the amount of thermal diffusion that occurs outside of the fiber core region.

In a further example, one or more additional resistive elements 55 are patterned outside of each illuminated region to produce a substantially similar reference resistor 57 that compensates for ambient temperature changes and potential long-term drift due to annealing or oxidation of the ITO film. Conductive pad regions 61 are over-coated with a <100 nm thick layer of chrome-nickel-gold on top of the ITO to provide low and stable contact resistance with the external circuit.

For highest resolution and sensitivity, an entire Wheatstone bridge circuit with four resistive elements can potentially be patterned in the vicinity of an optical fiber core, with only one of the four resistive elements actually crossing the light path.

A range of transparent conductive thin films are suitable for the in-line nano and micro-wire detectors disclosed herein. The thickness and composition of these coatings, as well as the dielectric layers above and below, are designed to minimize reflections and loss. The conductive coating is typically the top layer of a multilayer dielectric stack so that the metallic bus-board coating makes direct electrical contact.

Figure 11:
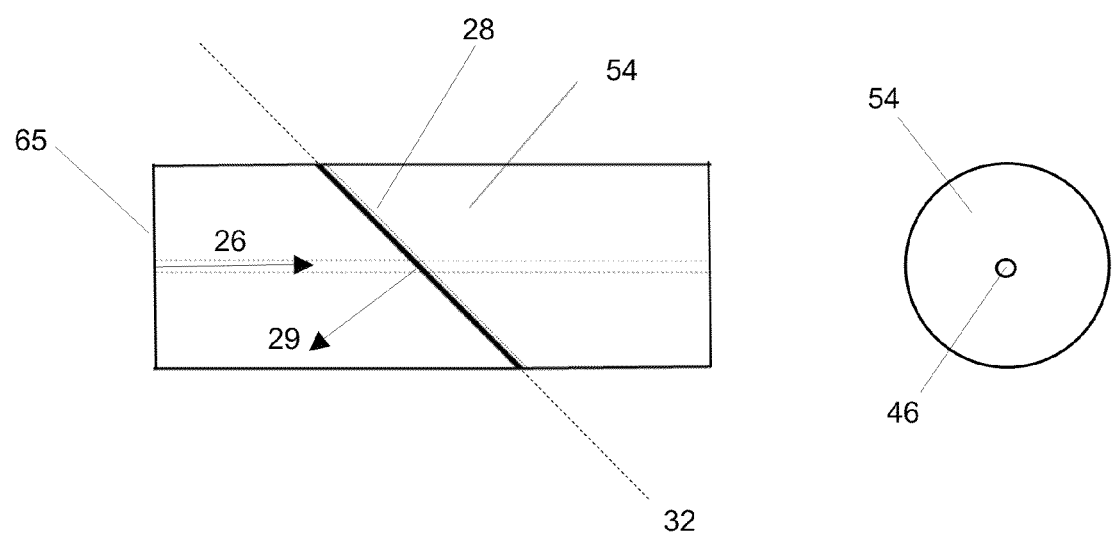
FIG. 11 illustrates the use to two fiber stubs with angled surfaces, with the detector coating at the angled contact surface of the two stubs.

To maximize the return loss of this in-fiber optical monitor, or equivalently, to suppress the coupling of backreflections into the device's input ports, the surface normal to the polished interface on which the detector is deposited and patterned can be angled by (FIG. 11), for example, eight degrees relative to the longitudinal axis of the core. This is standard angle for industry-standard APC type polished connectors. This angle is sufficient to direct optical backreflections 29 of the input optical mode 26 outside of the core acceptance angle by a factor exceeding 50 dB. If the cable end faces to be connected to the in-line monitor fiber end faces 65 are not angled, such as for UPC style connections, two in-line stubs can be used, with the detector coating 28 deposited on the surface of the fiber stub corresponding to the angled plane 32.

The temperature coefficient of resistivity (TCR) is dependent on the oxidation level within the ITO coating. Therefore, there is the potential for the TCR of ITO to drift based on environmental conditions (e.g., humidity). To mitigate this effect, a dense buffer coating may be deposited on top of the ITO coating. For example, a silica over-coating may be selectively applied to the top of the ITO coating. In this case, the metallic contact pads must be temporarily masked during the buffer coating process to prevent the metal from being covered with an insulator. Furthermore, in designs in which the ITO coating is integrated into a multilayer dielectric stack to reduce residual backreflections, the dielectric stack will also serve as the buffer layer.

Detector-On-Glass Optical Fiber Endface

Figure 3:
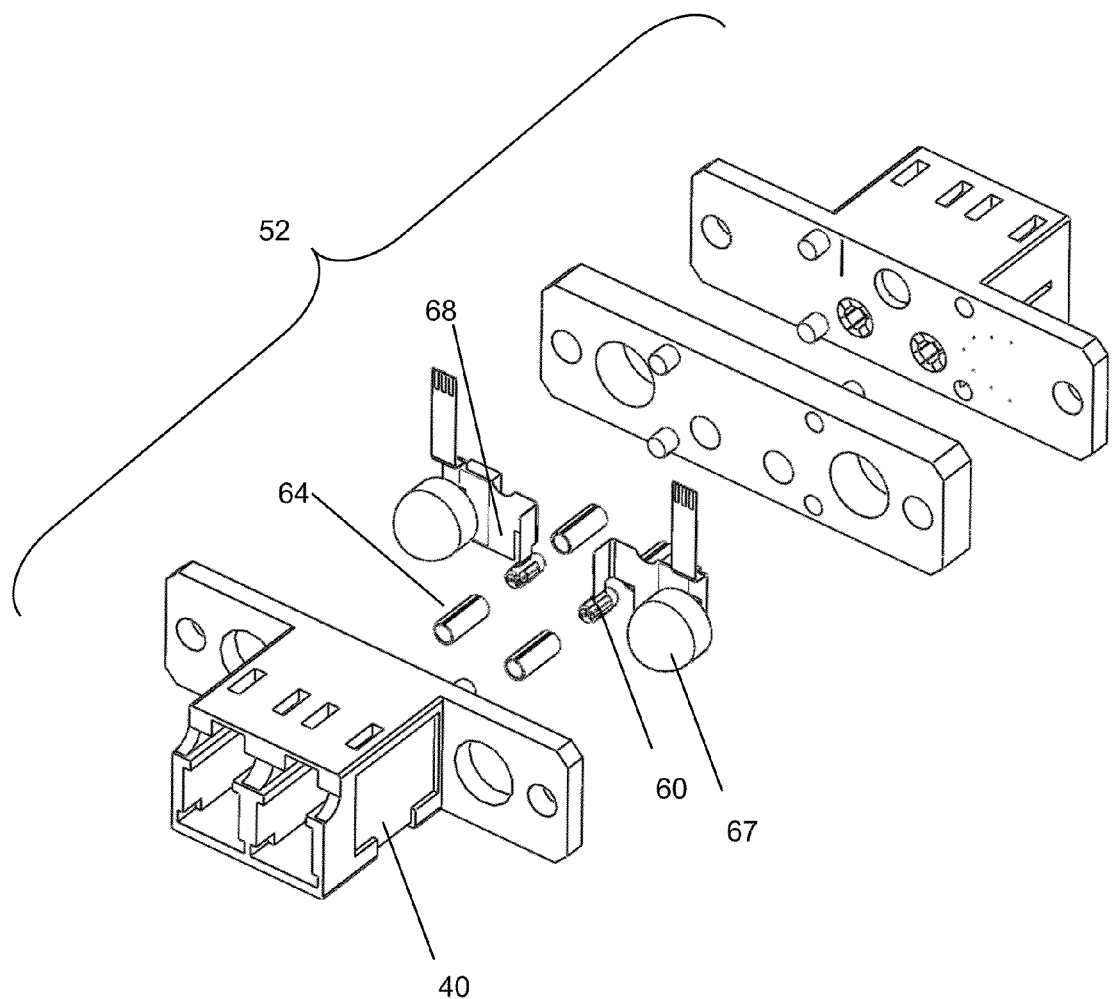
FIG. 3 is an exploded view of an alternative duplex fiber power monitor.

The in-line, duplex LC monitor adapter is shown with its housing, electrical interface, and fiber optic subcomponents in the exploded view in FIG. 3. The transparent detector elements are deposited on an optical fiber stub 60 end face integrated with industry standard connector input 39 and output 38 connector receptacles. The optical intensity/power monitor 52 is comprised of a duplex LC type connector adapter body 40, ceramic sleeves 64, fiber stubs 60 with internal, coated fiber end faces 65, electrical flexible circuit 68, and potentially a high intensity indicating LED 67.

Figure 4:
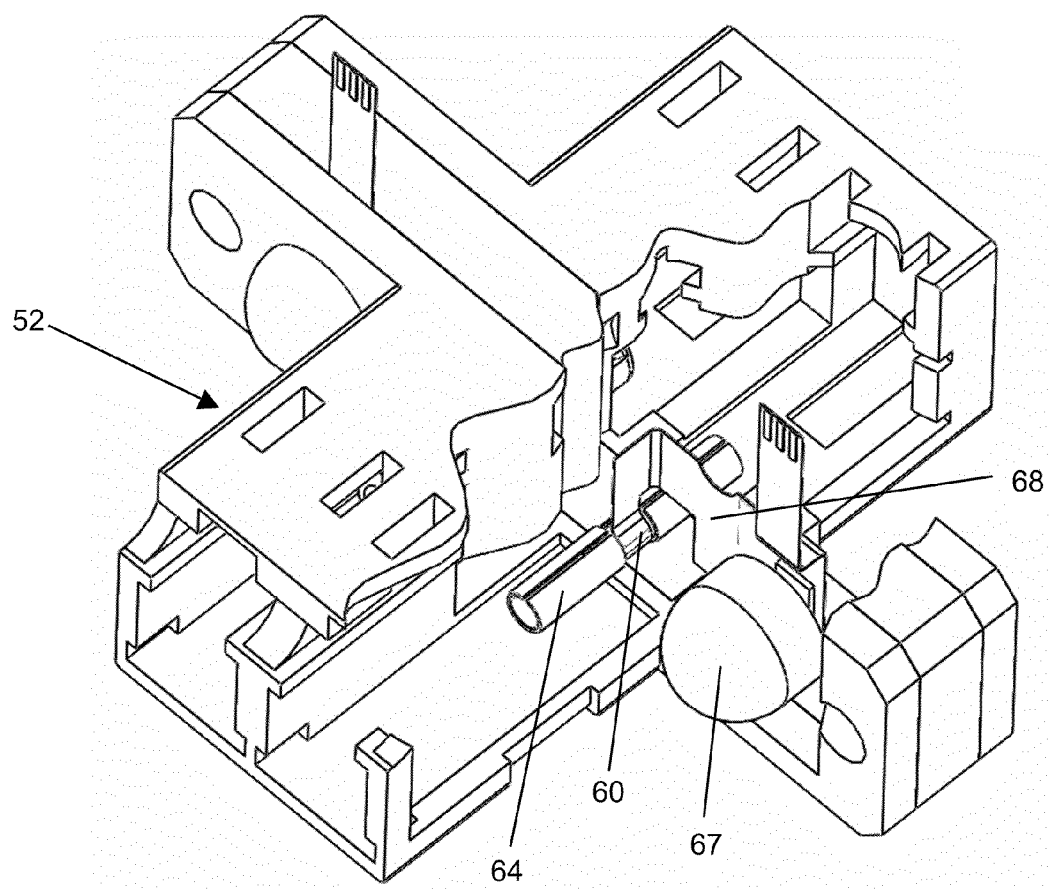
FIG. 4 is a partial cutaway view of the same duplex fiber optic power monitor, illustrated the location of the fiber stub, sleeves, and flexible printed circuit within the housing.
Figure 5:
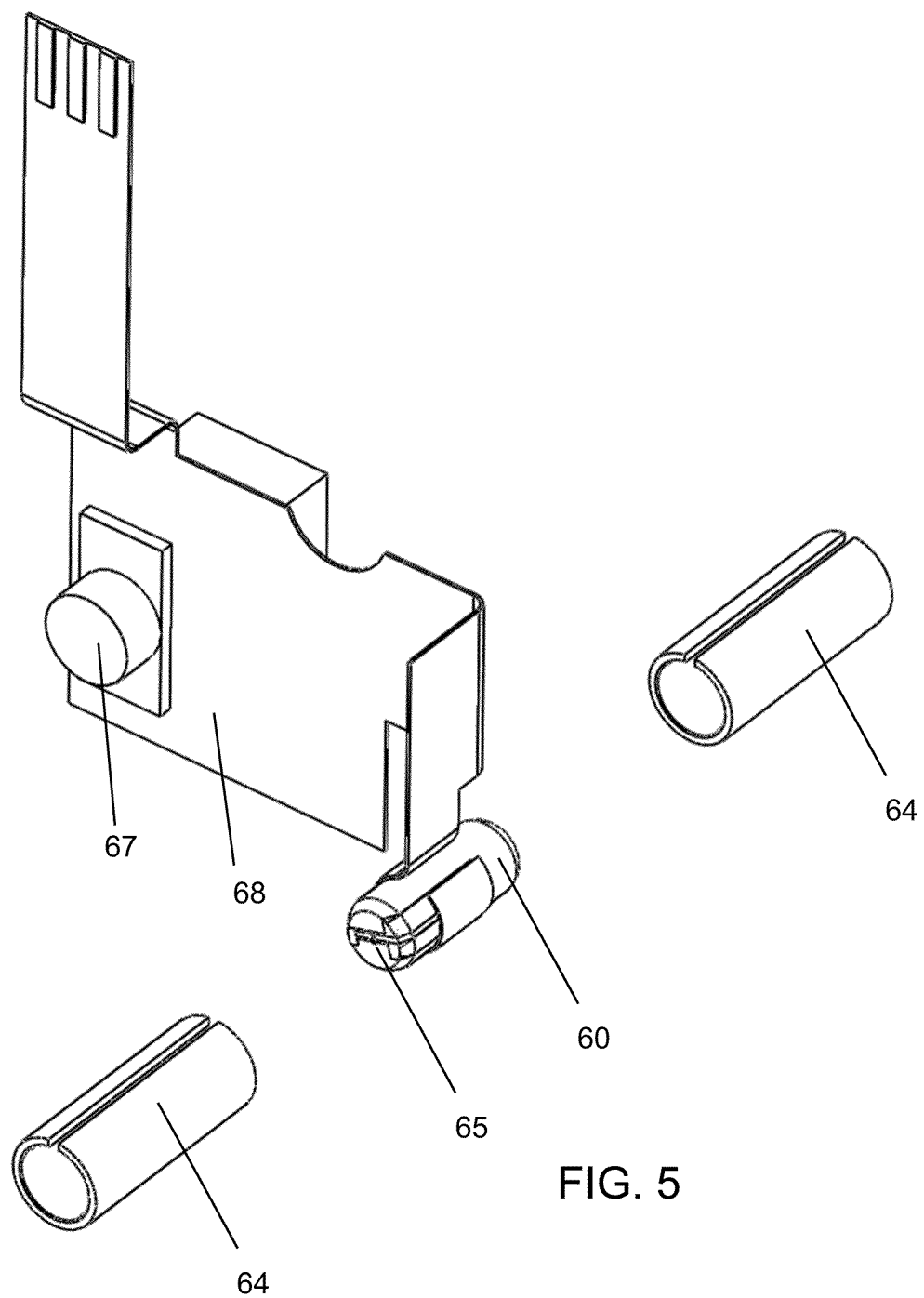
FIG. 5 is a magnified view of the internal element and electrical components.
Figure 6:
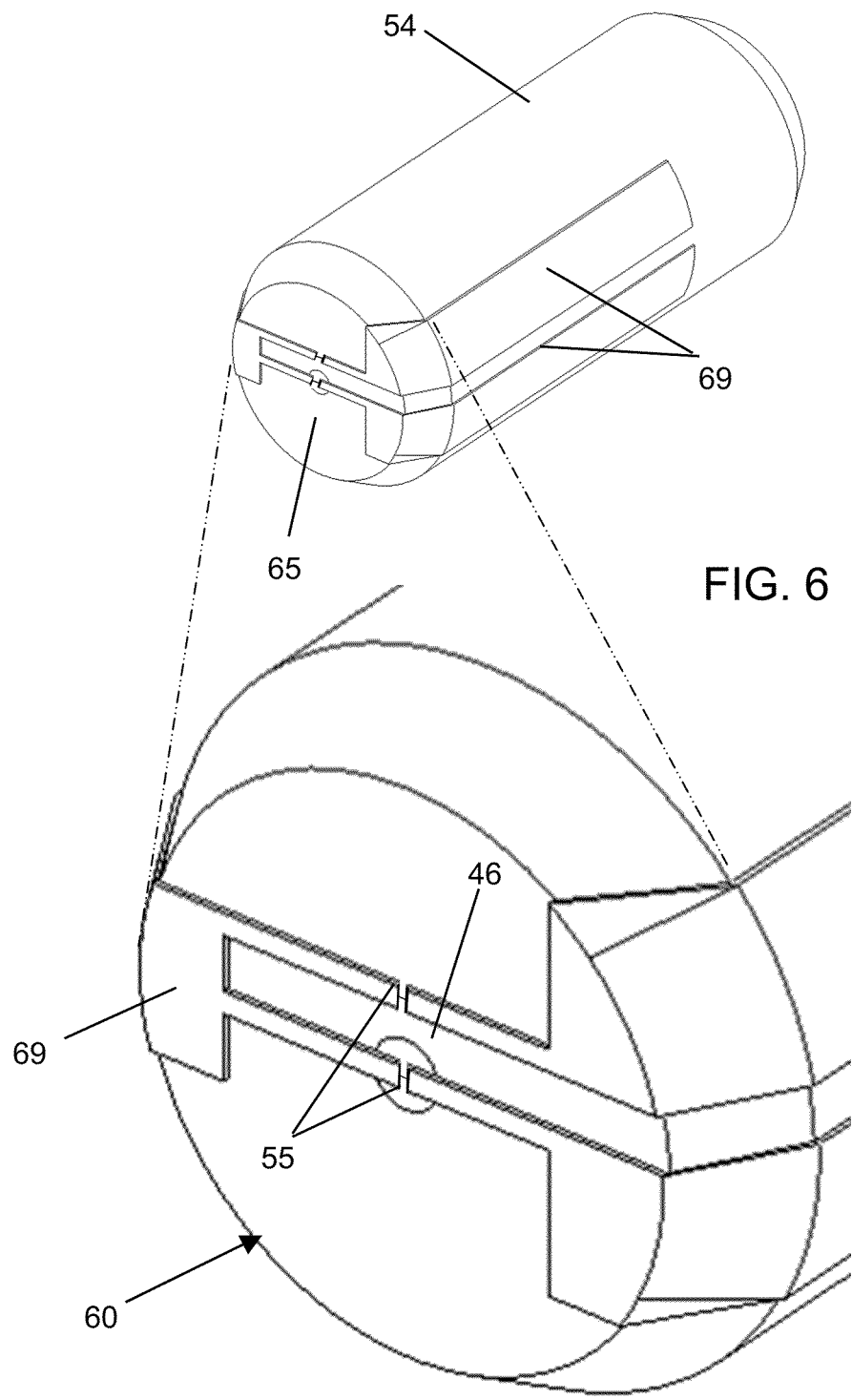
FIG. 6 illustrates a patterned fiber stub, with a magnified view of the patterned endface of the stub.

FIG. 4 further details the assembly in a partial cutaway view, revealing the internal fiber stub 60 retained within spaced apart sleeves 64. FIGS. 5 and 6 illustrate how the electronic flexible circuit 68 wraps around and is attached to the circumference of the fiber stub 60, thereby electrically interfacing conductive pads 69 on the stub sideways to the detector elements 55 formed on fiber end face 65. Typical flexible circuits have copper traces on a flexible kapton substrate.

FIG. 6 illustrates a further example of the patterned fiber end face with sensor resistor 55-1 and identical reference resistor 55-2 in detail. The ITO coating is deposited directly on the polished end face 65 of a single optical fiber 46 within a ferrule 54, thereby forming the fiber stub assembly 60. ITO is deposited on the end face 65 using a cold sputtering coating process (<120° C.) that does not degrade the epoxies used to bond the optical fiber 46 within the ferrule 54, and provides a dense and durable coating with excellent adhesion. A highly conductive Cr/Ni/Au coating 69 is selectively deposited by coating through a shadow mask. Since the contact geometry is relative coarse and low resolution, a shadow mask based on an injection molded cap with windows matching the areas to be deposited is acceptable and economical. This cap is plug onto the stub prior to the coating process. Note that is this example, the Cr/Ni/Au electrode patterning extends along the cylindrical walls of the stub, to facilitating subsequent attachment to an external circuit.

In a particular embodiment, laser patterning is used to define the ITO resistive trace 55 crossing the light guiding core of the optical fiber 46. The high-resolution patterning is aligned to the optical fiber core 56 by back-illuminating the fiber stub 60, the visible illumination is captured and waveguided down the core to the front surface. This produces a visible marker corresponding to the waveguide core, since the light spilling into the cladding is dissipated. The width of the trace 55 ranges from 0.01 to 25 µm and its length is 25 to 50 µm. The trace length is selected to ensure that any metallic electrodes are far enough from the optical fiber core 56 to prevent unwanted absorption. Typically, a wide ITO lead-in region is located intermediate the resistive trace 55 and metallic electrode 61.

The optical fiber core diameter is typically 50 to 62.5 μm for multimode fiber, 9 μm for single mode fiber and 25-100 μm for large mode area fiber. The confined waveguide mode is partially absorbed by the conductive coating to produce localized heating of the resistor sensor element 55 and thereby induce a resistance change ΔR. Due to the low thermal conductivity of silica, the host material of optical fibers, only a small amount of thermal diffusion occurs outside of the fiber core region. A second, non-illuminated resistor is patterned outside the core region 56 to act as a reference resistor. Typically, two resistors 55-1, 55-2 of the Wheatstone ac bridge circuit 81 are patterned in ITO on the fiber end face 65, and two resistors are provided for externally. By applying an AC or DC voltage across this pair of resistors in series, the voltage at the center tap between the two resistors can be measured. This voltage will be relatively insensitive to ambient temperature changes because the self-compensating, balanced resistor pair, and the voltage is a highly linear representation of the optical intensity.

Split sleeves 64 are fabricated of zirconia ceramic with a diameter of 1.25 mm for LC/MU/MTRJ connectors and 2.5 mm for SC/FC/ST connectors. Fiber optic cables are interconnected by inserting their polished end faces into opposite ends of the receptacles 38, 39 and into the central split sleeves, thereby coupling light from optical fiber cores 56 through the in-line fiber stub 60 and detector coating.

In a particular example, the detector stub can then be integrated within the housing of an in-line fiber optic adapter along with an internal CMOS integrated circuit. The stub with detector element is positioned at the center of the adapter as shown in FIG. 4. This duplex (two fiber) bulkhead-union type adapter consists of a metal or plastic housing containing the precision split sleeves that retain each stub.

Additional Design Considerations

To optimize this Detector-on-Fiber device for high optical sensitivity, a combination low resistivity conductive coating 69 (not necessarily transparent) and a high resistivity transparent conductive coating forming detector wires 55 are deposited on the same fiber end face 65. The low resistivity coating such as gold is selectively masked to form contact pads 69 extending onto the circumferential surface 54 of the fiber stub 60 and highly conductive buses 69 to the central ITO elements 55-1, 55-2. The metallic coating is masked at the location of the thin conductive traces 55 between gold contact pads so little or no optical power within the core 56 is absorbed by the gold contacts.

The higher resistivity ITO coating in contact with and extending beyond this gold layer overlaps the guided optical beam, so that the resistance of the narrow wire 55 dominates the total resistance as measured between contact pads 69. In this example, there are three contact pads (one is not visible in this perspective view) at opposite ends of the two resistive elements 55 in series. The three contact pads correspond to the excitation voltage, the voltage return, and the tap voltage. By measuring the tap voltage, the resistance change resulting from optical heating is separated from potential resistance changes resulting from ambient temperature changes.

Figure 7:
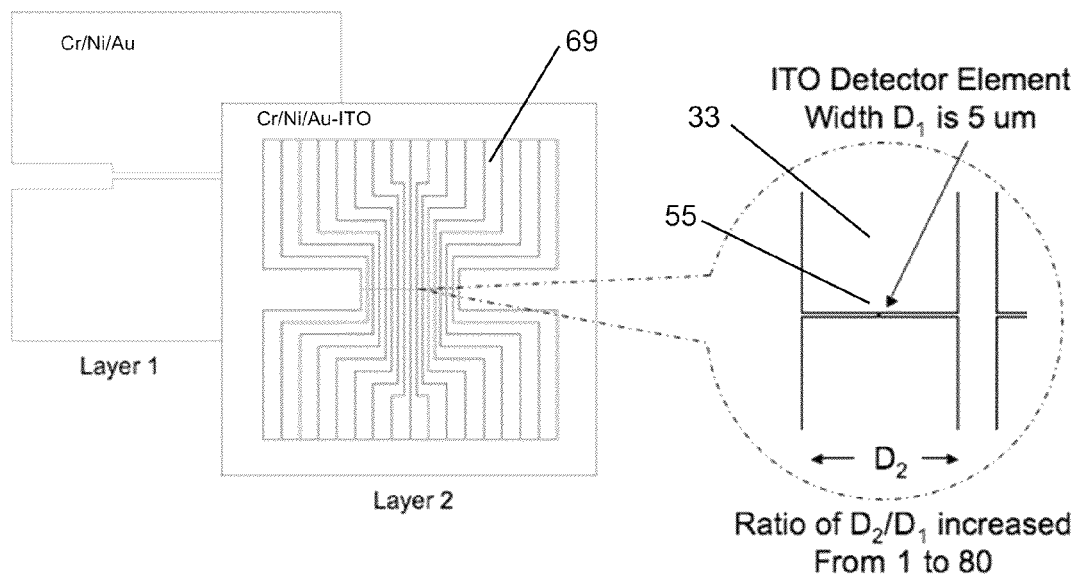
FIG. 7 illustrates an example pattern and resulting optimization used to produce an ITO detector array.

In a further example, FIG. 7 illustrates the lithographic patterning steps to form a detector array on a substrate. The first step is to deposit a uniform ITO coating across the substrate. The second step is to deposit a Cr/Ni/Au coating through a shadow mask (Layer 1 in FIG. 7). The shadow mask is adequate for the coarse patterning used on this layer. The third step is to pattern the combination ITO and Cr/Ni/Au using the geometry shown in Layer 2. This final step defines the outer contact electrodes as well as the microwire or nanowire ITO trace 55. Typically, the ratio of the width of the ITO lead-in trace 33 to the ITO trace 55 should be maximized. Typically, values in the range of 50 to 500 are adequate to ensure the dominant component to the resistance results from the ITO trace intersecting the optical fiber core.

The thickness and composition of the ITO are designed to minimize reflections from the coating interface. The ITO coating may be designed as one layer of a multilayer dielectric stack. In addition, the surface normal to the polished fiber interface can be angled by, for example, 8 degrees relative to the longitudinal axis of the core. This angle is sufficient to direct residual backreflections outside of the angular acceptable angle of the single mode fiber core by a factor of more than 50 dB.

Figure 8:
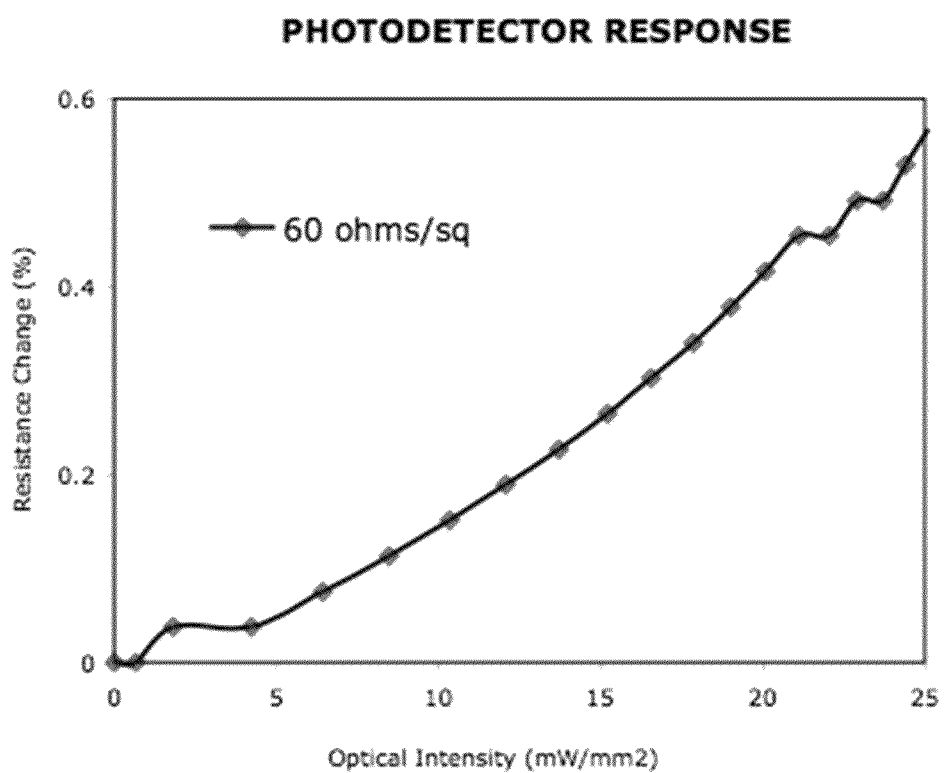
FIG. 8 illustrates the measured resistance change of the transmissive optical detector for varying optical signal intensity, which is proportional to optional power for the case of waveguiding illustrated here.

FIG. 8 illustrates the measured microwire detector response as a function of optical intensity at a wavelength of 1480 nm. For this particular example, the detector exhibits an intensity sensitivity of about 5 mW/mm$^2$, thereby providing a very acceptable signal-to-noise ratio in typical communication networks where the intensities typically exceed 100 mW/mm$^2$.

To maintain a sufficiently low level of backreflection from the detector thin film coating, the conductive coating is designed as one or more layers of a multilayer antireflection coating. For a further reduction of backreflection, the detector coating may be deposited on an angled surface relative to the propagation direction of the beam. For example, a detector may be deposited and formed on the inner, angled surface between a pair of fiber stubs surrounding the detector layer. By increasing the angle of incidence of the beam and the coating from 0 to 8 degrees, the backreflection power can be attenuated by an additional factor of 40 to 60 dB. For example, a standard APC angle polish process can be utilized to seamlessly interface with industry-standard fiber optic connectors and provide high return loss.

EXAMPLE APPLICATION

Laser Radiation Safety Monitor

In a further example, the transmissive thin film detector includes a CMOS integrated circuit 63 to measure resistance change and compare the resistance change to a threshold level, above which a warning LED 67 is activated at the connector adapter or remote network monitoring terminal. In a particular implementation, this LED 67 illuminates red for laser power exceeding the ANSI Z136.2 eye safety standard and green for laser powers below the standard.

The optical detectors in accordance with this invention measure the optical intensity/power within optical fibers in a non-invasive fashion and can warn users of unsafe optical intensity levels. Note that injury is a direct consequence of high optical intensity, not necessarily power, so that this detection mechanism is ideally suited for such applications. The integration of this in-line optical detector 52 with an integrated drive circuit 63 enables the LED 67 at the monitor adapter 52 to be activated when the optical intensity exceeds a threshold. The LED provides a visible warning of the presence of potentially harmful invisible optical radiation or identifies those fibers carrying live data.

The fiber optic high power, in-line fiber optic intensity monitor 52 disclosed herein is a transmissive bolometer utilizing a thin (typically 5 to 50 nm thick) ITO or other transparent conductive coating acting as a resistor element 55 that absorbs a small percentage (<10%) of incident infrared illumination. The resistivity of ITO typically increases with temperature [Z. Q. Li et al., J. Appl. Phys. 96, pp. 5918-5920 (2004)]. However, for thin films deposited under oxidation conditions that enhance conductivity by tunneling [J. Ederth et al., Phys. Rev. B 68, pp. 155410-1-155410-9 (2003)], the resistivity instead decreases with increasing temperature. While the sign depends on processing conditions, in general, the magnitude of the temperature coefficient increases for films with higher sheet resistivity (that is, thinner coatings). There is a potential for the temperature coefficient of resistance to drift based on environmental conditions (e.g., humidity). To maintain a stable detector response, the ITO coating should be overcoated with a silica buffer layer, for example.

Further examples of monitoring devices incorporate this patterned ITO coating within antireflection coatings and/or wavelength selective, thin film or dichroic interference coatings. Also, by reducing the dimensions of the resistive trace 55 to the nanometer scale, the detector also has the potential for high-speed operation with a bandwidth approaching GHz.

The physical mechanism underlying this detector design is a photo-thermal-resistive conversion process which is intensity dependent. The optical intensity at the core of an optical fiber 46 is relatively high due to waveguide confinement and for typical applications exceeds the 50 $\mu W/mm^2$ $^{level}$ necessary to produce localized ITO heating. In fact, a few mW of absorbed optical power within a highly localized area can produce a temperature increase of over 100° C. This increase produces a corresponding change in the resistivity of the transparent conductor, which can be detected by an electronic bridge circuit with a resolution as high as a part-per-million [T. Wilbands, M. Devlin, A. E. Lange, S. Sato, J. W. Beeman, E. E. Haller, IEEE Transactions on Nuclear Science, 37, pp. 566-572 (1990)].

Optimally, the detector element is sandwiched between thermally insulating materials to reduce heat transfer from the core. This is automatically achieved when the detector film is inserted between mating optical fibers. Thermal conduction or convection at the resistive element would otherwise diminish the temperature gradient and degrade the sensitivity of the detector.

The sensitivity of this detector increases, without compromising overall optical loss, by increasing the optical absorption of the coating while reducing the resistor feature size. Miniaturization also reduces the response time of the detector, which is about 10 $\mu$sec for a 1×10 $\mu$m detector element. Based on finite element simulations for 1% absorption, the coating experiences a 17.5° C. temperature rise upon illumination with 10 mW focused to a 10 $\mu$m spot diameter. This corresponds to the typical intensity levels of short-range fiber optic communication systems, for example. For maximum sensitivity, the ITO layer should be thermally isolated from the surroundings by depositing on silica or plastic substrates with low thermal conductivity. The substrate thereby serves as a thermal insulator.

In general, this new class of transmissive detector is applicable to a broad range of applications. It can be formed on any surface(s) within an optical system, including plastic film, lenses, flat or curved glass and plastic windows. This class of optical detector is a derivative of bolometer arrays; however, it has a unique combination of transparency and optical sensing capability, as well as the potential for high bandwidth using nano-scale wires. For example, detectors can be implemented on curved optical surfaces such as lenses or arrayed on a substrate for imaging. Resistor feature size can be reduced to the nanometer level to decrease thermal response times to 1 ns. Alternative transparent conductive material systems such as indium zinc oxide, thin superconductor or semiconductor-based coatings, carbon nanotubes and even non-transparent metallic films patterned with subwavelength detector elements can be utilized.

This thermo-resistive optical detection mechanism is sensitive to a broad range of optical frequencies spanning the visible, infrared and THz spectral ranges. Potentially, detectors can be printed inexpensively on light bulbs or LED's for the purpose of monitoring light output and warning of imminent failure, for instance. This application may be particularly important as a compact and economical solution for critical indicator, signaling or safety lights. The detector can be incorporated into multilayer dielectric stacks such as those used in wavelength division multiplexing (WDM). This structure enables wavelength specific detection within a narrow band of wavelengths (<1 nm). In general, this detector is sensitive to a broad range of optical frequencies spanning the visible, infrared and THz spectral ranges and can potentially be incorporated into laser collimators to warn of laser illumination launched into free space, or even "smart" eye glasses that not only protect against, but also detect unsafe light levels.

The optical transparency of this detector is potentially enhanced by integrating within a low loss, low backreflection, multi-layer dielectric stack. The detector can be fabricated on the polished endface of an optical fiber to minimize optomechanical complexity. A standard AC resistive bridge 81 approach simplifies integration with detector circuitry. An electronic multiplexer 80 can read any of a multiplicity of detector elements onto a single shared, analog-to-digital converter 82 and digital communication transceiver.

EXAMPLE APPLICATION

Automated Network Monitoring

Figure 9:
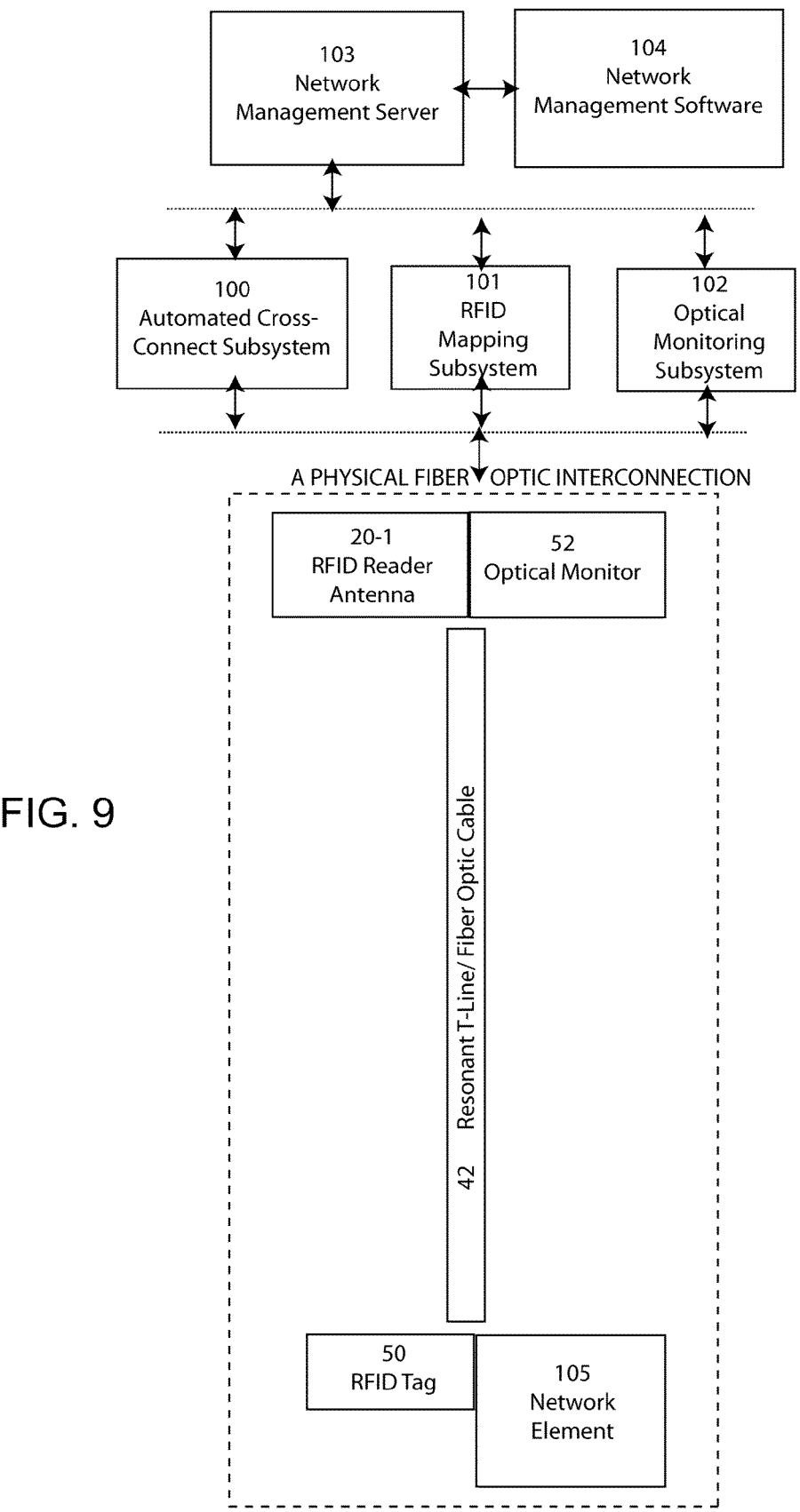
FIG. 9 is a block diagram of an automated network system utilizing the optical monitors disclosed herein.

In a further example, the unique features of this detector element enable optical intensity, and by extension, optical power, to be measured through fiber optic junctions in a low cost fashion. This fundamental hardware component enables advanced self-monitoring and self-diagnosing network architectures can be realized for Fiber-to-the-Home networks and data centers, in which automation is applied to improve operational efficiencies and service quality/response. FIG. 9 illustrates in block diagram form an automated network management system with integral optical monitors 52 associated with each fiber optic interconnection 42. Through suitable electronic calibration, the optical monitors 52 disclosed herein produce an analog voltage proportional to throughput optical power. These analog signals are time multiplexed onto one or more analog-to-digital conversion ports. The resulting digital data packets represent the optical power reading and the physical and/or geographic location of the power reading. The location is determined in part by an RFID mapping subsystem which operates in parallel with the fiber optic lines. The power readings are communicated back to the one or more network management servers 103 and its distributed network management software 104 through the one or more optical monitoring subsystems 102. Each subsystem 102 independently performs the multiplexing and forms the data packets for transmission back to the servers 103. In this fashion, routine power measurements can be performed automatically and remotely, eliminating the need for costly manual labor and the risk of costly errors.

Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A device responsive to optical intensity propagated along an optical axis, with minimal attenuation of a corre- sponding optical power, wherein the device is disposed between adjoining end faces of optical fibers having optical cores encompassed by cladding materials, the device comprising:
- a substantially optically transparent elongated element interposed between the end faces of the optical fibers, said element including a substrate having a thickness in the range of 12.5-125 micrometers and an optical power-absorbing resistor material disposed on said substrate and configured as less than about 10 microns in width and 5-50 nm in thickness, the element being disposed substantially parallel to the fiber end faces and substantially transverse to the optical cores therein to intercept optical power propagated along the optical core regions, the element absorbing less than 10% of the optical power propagated therealong, and
- an electrical circuit conductively coupled to spaced apart regions of the element exterior to the optical core and responsive to thermally induced variations of resistivity in the element in response to absorption therein of optical power transmitted along the cores of the optical fibers, the variations of resistivity being linearly dependent on optical intensity.

2. A device as set forth in claim 1 above, wherein the substrate is formed from a material selected from the group comprising plastic and glass; and said resistor material is indium tin oxide (ITO) material.

3. A device as set forth in claim 1 above, wherein the thickness and width of the resistor material is selected to be thermally responsive to radiation at wavelengths of 800 to 1600 nm.

4. A device for disposition in an optical fiber transmission link, for monitoring a power level of radiation propagated in a confined mode along a transmissive core of an optical fiber, wherein the link includes at least one partially transverse end face in the core, comprising:
- at least one transducer element on a substantially transparent flexible film substrate disposed transversely across a fractional part of the partially transverse end face of the core to intercept a band of radiation propagated therealong, the transducer element being predominately transmissive but also measurably thermally responsive by linear resistance variation to optical intensity of the radiation propagated along the core; and
- an electrical circuit coupled to the opposite ends of the transducer element, outside the core of the optical fiber, and measuring resistance changes in the transducer element under thermal reaction to the optical intensity of the radiation propagated along the core.

5. A device as set forth in claim 4 above, wherein the transducer element has a thickness along the optical axis of less than 50 nm, and has a width transverse to the optical axis of less than 10 microns.

6. A device as set forth in claim 4 above, wherein the transducer element introduces less than 10% absorption and less than 10 dB attenuation in the radiation propagated along the optical fiber.

7. A device as set forth in claim 4 above, wherein the transducer element is indium tin oxide (ITO).

8. A device as set forth in claim 4 above, wherein the at least one transducer element comprises two parallel elements each having an intermediate trace section interior to the end face, the trace section of one said two parallel elements being within the transmissive core of the optical fiber and the trace section of the other of said two parallel elements being outside the transmissive core.

9. A device as set forth in claim 8 above, wherein the trace portions of the element are coupled in a Wheatstone bridge circuit as separate arms of the bridge circuit.

10. A device as set forth in claim 4 above, wherein the optical fiber comprises a fiber optic stub having an end face, and the transparent film substrate is disposed on the end face.

11. A device as set forth in claim 10 above, wherein the stub comprises a substantially constant outside diameter section of optical fiber extending from the end face thereof, and wherein the electrical circuit includes terminal sections extending from first and second opposite ends of the transducer element on the end face along longitudinal sides of the stub to provide circuit connection.

12. A device as set forth in claim 4 above, wherein the transducer element comprises a laminate including the substrate, a thermally responsive transducer trace and a layer of non-reflecting material.

13. A device as set forth in claim 4 above, wherein the end face of the core is at a non-reflecting angle of approximately 8° relative to a plane transverse to the axis of transmission of radiation.

14. An in-line fiber optic component for monitoring optical power with low loss and low backreflection having two transparent thin film resistors in series, one of said resistors intersecting the core of an optical fiber, comprised of:
- a housing with two longitudinally opposing connector receptacles sized to receive opposing fiber optic connectors;
- a first electrical contact to supply a reference voltage to the component;
- a second electrical contact to supply a return path for a reference voltage from the resistors;
- a third electrical contact coupling to the center tap between the two resistors in series, wherein the voltage measured at the center tap is proportional to optical power passing through the in-line fiber optic component; and
- wherein said first, second and third electrical contacts and said two transparent thin film resistors are disposed on a transparent flexible substrate between said opposing fiber connectors.

15. A component in accordance with claim 14, wherein the thin film resistors correspond to patterned wires on said transparent flexible substrate having a width of less than 25 μm, a length greater than 50 μm, and comprised of an indium tin oxide coating of 5 to 50 nm thickness.

16. A fiber optic stub for optical detection applications comprised of:
- a length of cylindrical ceramic ferrule having a center channel concentric with its diameter;
- a length of optical fiber equal to the ferrule length and having an optical fiber core, positioned within the center channel of said ferrule and having polished end faces at opposite ends;
- a transparent conductive oxide and a metallic contact layer on at least one of the end faces, wherein the transparent conductive oxide is patterned as a length on the end face to form one or more resistive traces having a width less than the optical fiber core and traversing the same, and a length greater than the optical fiber core, at least one of the resistive traces intersecting the optical fiber core, and the metallic contact layer extending from each end of the length of transparent conductive oxide on the end face to cylindrical sidewalls of the ferrule, the contact layer being patterned on the end face as well as the sidewalls of the length of optical fiber to produce two or more electrical contacts for attachment to an external electronic circuit.

17. A stub in accordance with claim 16, wherein the length of ceramic ferrule is 3 to 5 mm and at least one polished end face lies at an angle greater than 1 degree relative to a longitudinal axis of ferrule.

18. A stub in accordance with claim 16, wherein the transparent conductive oxide is indium tin oxide (ITO) and the metallic contact layer includes a chrome layer, a nickel layer and a gold layer.

19. A transmissive optical detector element that transmits a substantial fraction of intersecting optical power while absorbing a small fraction of optical power, comprised of:
  one or more optical fibers;
  a flexible, transparent substrate in precise transverse alignment and in contact with a transverse face on one or more of the optical fibers;
  a transparent conductive coating deposited on said substrate, the transparent conductive coating being patterned to define at least two resistive traces whose localized temperature changes are response to changes in the absorbed intersecting optical power, one of said traces intercepting optical power and the other being spaced away from the optical power, and
  a metallic conductive coating deposited on top of the transparent conductive coating and being positioned to define contact electrodes spaced from the optical power transmission, wherein the contact electrodes are attached to opposite ends of the at least two resistive traces.

20. A detector element in accordance with claim 19 wherein the intersecting optical power has a wavelength of 1200 to 1700 nm and the substrate is a polyester or polysulfone film of 10 to 100 μm thickness.

21. A detector element in accordance with claim 19 wherein less than 10% of the optical power is absorbed by the transparent conductive coating and the substrate and the at least two resistive traces each has a width of less than 25 μm.

* * * * *